United States Patent
Doha et al.

(10) Patent No.: US 10,845,019 B2
(45) Date of Patent: Nov. 24, 2020

(54) LIGHTING DEVICE FOR A MOTOR VEHICLE

(71) Applicant: VALEO VISION, Bobigny (FR)

(72) Inventors: Jean-Francois Doha, Angers (FR); Sylvain Giraud, Angers (FR); Yves Gromfeld, Angers (FR); Maxime Laminette, Angers (FR)

(73) Assignee: VALEO VISION, Bobigny (FR)

(*) Notice: Subject to any disclaimer, the term of this patent is extended or adjusted under 35 U.S.C. 154(b) by 0 days.

(21) Appl. No.: 16/029,137

(22) Filed: Jul. 6, 2018

(65) Prior Publication Data

US 2019/0011104 A1    Jan. 10, 2019

(30) Foreign Application Priority Data

Jul. 6, 2017 (FR) .................................... 17 56398

(51) Int. Cl.
| | |
|---|---|
| *F21V 5/00* | (2018.01) |
| *F21S 41/265* | (2018.01) |
| *F21S 41/143* | (2018.01) |
| *F21S 41/153* | (2018.01) |
| *F21S 41/62* | (2018.01) |

(Continued)

(52) U.S. Cl.
CPC .............. *F21S 41/265* (2018.01); *B60Q 1/14* (2013.01); *F21S 41/143* (2018.01); *F21S 41/153* (2018.01); *F21S 41/40* (2018.01); *F21S 41/43* (2018.01); *F21S 41/62* (2018.01); *F21S 41/663* (2018.01)

(58) Field of Classification Search
CPC .................................................... F21S 41/663
See application file for complete search history.

(56) References Cited

U.S. PATENT DOCUMENTS

| | | |
|---|---|---|
| 2015/0070926 A1 | 3/2015 | Stefanov et al. |
| 2016/0265733 A1* | 9/2016 | Bauer ............... G02B 3/0006 |
| 2018/0038567 A1 | 2/2018 | Park |

FOREIGN PATENT DOCUMENTS

| | | | |
|---|---|---|---|
| DE | 10 2008 044 967 A1 | 7/2009 | |
| DE | 102010023360 A1 * | 4/2011 | ............ F21S 41/143 |

(Continued)

OTHER PUBLICATIONS

French Preliminary Search Report dated Apr. 9, 2018 in French Application 17 56398 filed on Jul. 6, 2017 (with English Translation of Categories of Cited Documents).

*Primary Examiner* — Matthew J. Peerce
(74) *Attorney, Agent, or Firm* — Oblon, McClelland, Maier & Neustadt, L.L.P.

(57) ABSTRACT

A lighting device, including an array of at least two light sources of the light emitting semiconductor type and an array of at least a first illumination element and a second illumination element, each illumination element being associated with one of the light sources and configured for being lit the associated light source in such a way that a light beam emitted by the light source exhibits a shape dependent on a shape of the illumination element, the first illumination element being of trapezoidal shape having a large base and the second illumination element having a shape partially complementary to the trapezoidal shape and including two edges extending from two opposite ends of the large base, parallel with each other, being distant by at least a length of the order of the length of the large base.

19 Claims, 4 Drawing Sheets

(51) Int. Cl.
*F21S 41/43* (2018.01)
*F21S 41/663* (2018.01)
*F21S 41/40* (2018.01)
*B60Q 1/14* (2006.01)

(56) References Cited

FOREIGN PATENT DOCUMENTS

| | | |
|---|---|---|
| DE | 10 2014 110 282 A1 | 1/2016 |
| EP | 2 306 075 A2 | 4/2011 |
| EP | 2 501 206 A1 | 9/2012 |
| EP | 2 846 077 A2 | 3/2015 |
| KR | 10-1754 169 B1 | 7/2017 |

\* cited by examiner

LIGHTING DEVICE FOR A MOTOR VEHICLE

The invention relates to a lighting device for a motor vehicle.

The invention is particularly applicable to a lighting headlamp in high beam and low beam mode for a motor vehicle.

In FIG. 1 there is shown a motor vehicle moving on a traffic lane 2 adjacent to another lane 3.

In low beam mode, as shown in FIG. 1, a light beam emitted by front headlamps exhibits a first lighting zone 4 extending on the surface of the lane 2 upon which the vehicle 1 is travelling and a second lighting zone 5 extending on the surface of the lane 3.

It is known that the second lighting zone 5 has a cut-off 6 such that the area of the second lighting zone 5 is smaller than the area of the first lighting zone 4.

The cut-off 6 makes it possible not to dazzle a driver of a vehicle travelling on the lane 3.

It is also known to slave the direction du beam emitted by the front headlamps of the motor vehicle to an angle of rotation of the steering wheel, which ensures that the direction of the beam follows the geometry of the lane upon which the vehicle is travelling, and in particular the trajectory of the vehicle in a bend.

In order to do this, use is generally made of a mechanical system making it possible to pivot each front headlamp about a vertical axis.

Moreover, in the motor vehicle field, it is increasingly common to use arrays of light emitting diodes (LED) as light sources for the headlamps.

Thus, there is known a lighting module for a motor vehicle, comprising at least two lighting units, each lighting unit comprising at least one light source of the light emitting semiconductor type and a means of control of the light source, the means of control of the lighting units being independent with respect to each other, each lighting unit comprising an illumination element configured for being lit by the said at least one lighting source in such a way that a light beam emitted by the light source exhibits a light distribution over a plane dependent on a shape of the illumination element.

Such a module, because of the use of LEDs, is advantageous insofar as LEDs consume little energy, have a long service life and generate only a slight amount of heating. LEDs also make it possible to vary the shapes of the headlamps and thus to create light signatures for certain models of vehicles.

However, it is difficult for such LED arrays to be compatible with the mechanical headlamp pivoting mechanism.

The purpose of the present invention is to overcome these disadvantages.

For this purpose, the invention relates to a lighting device for a motor vehicle, comprising an array of at least two light sources of the light emitting semiconductor type and an array of at least a first illumination element and a second illumination element, each illumination element being associated with one of the light sources and configured for being lit by the said associated light source in such a way that a light beam emitted by the light source exhibits a shape dependent on a shape of the illumination element, the first illumination element being of trapezoidal shape having two opposite parallel sides, called bases, such that one of the bases, called the large base, is longer than a length of the other base, called the small base, the said trapezium also having two sides that are not parallel with each other and connecting the large base and the small base, and the second illumination element having a shape partially complementary to the trapezoidal shape and comprising two edges extending from two opposite ends of the large base, parallel with each other, being distant by a length of the order of the of the large base.

Thus, thanks to the present invention, it is possible to generate a uniform light beam made possible by the association of the trapeziums and of the trapezium counterforms.

It is also possible to produce a light beam in low beam mode which follows the geometry of the road without having to use a mechanical pivoting system.

In fact, when the road follows a straight line, the cut-off of the beam is for example generated by one of the non-parallel sides of one of the trapeziums, called the first lighting unit, whereas when the lane upon which the vehicle is travelling winds, in particular in a bend, it suffices to switch off the first lighting unit and to illuminate solely another trapezium, called the second lighting unit, the cut-off of the beam then being generated by one of the non-parallel sides of the second lighting unit.

According to another feature of the invention, the device comprises at least three light sources and three illumination elements, the third illumination element extending from the large base of the first element of trapezoidal shape in a direction opposite to the edges of the second illumination element complementary to the first illumination element.

According to another feature of the invention, the device comprises a bar of at least three aligned illumination elements of trapezoidal shape.

According to another feature of the invention, each illumination element a lens.

According to another feature of the invention, the device comprises a module for projection to infinity at the output of the array of illumination elements.

According to another feature of the invention, the module for projection to infinity comprises at least one lens.

According to another feature of the invention, the device comprises two lenses and a diaphragm for filtering light rays disposed between the two lenses.

The invention also relates to a lighting system for a motor vehicle comprising two lighting devices such as described above.

Other features and advantages of the invention will furthermore become apparent on reading the following description. The latter is purely illustrative and must be read with reference to the appended drawings in which:

FIG. 3b shows a detail of FIG. 3a;

FIG. 4 shows a perspective side view of the array of shaping elements shown in FIG. 3a;

LIGHTING DEVICE

Figure 1:
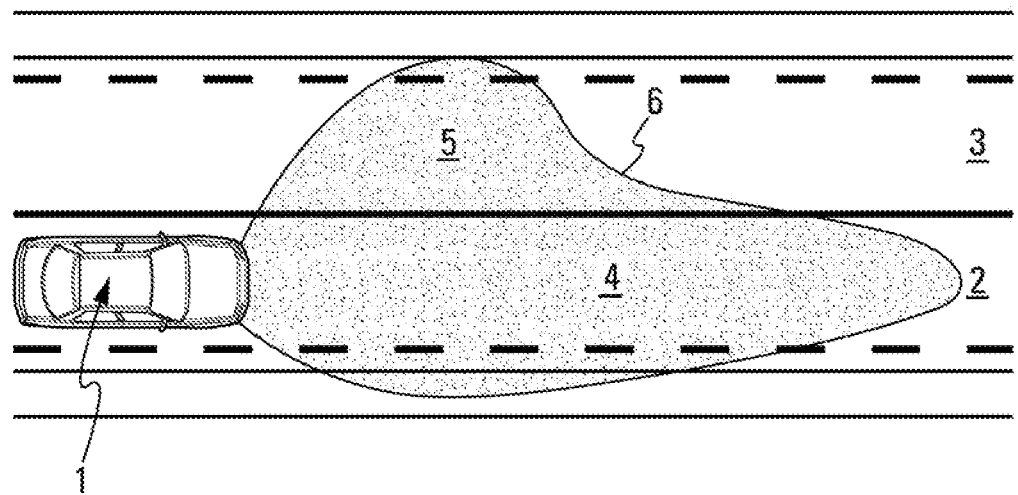
FIG. 1 shows a plan view of a motor vehicle travelling on a road whilst lighting the road in low beam mode, as already described.
Figure 2:
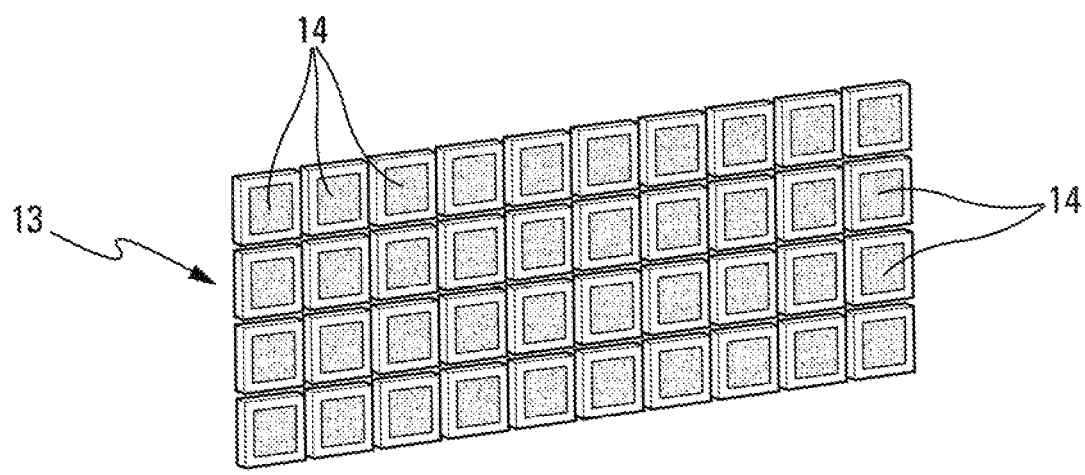
FIG. 2 shows a perspective side view of an array of light sources of a lighting device according to the present invention.
Figure 3A:
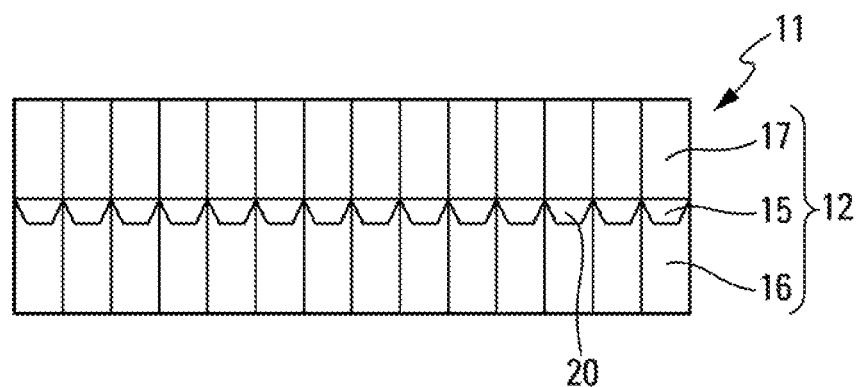
FIG. 3a shows a front view of an array of shaping elements associated with the array shown in FIG. 2.
Figure 4:
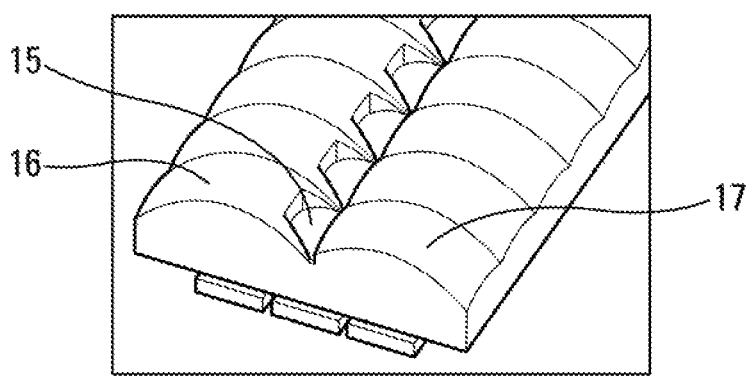
Figure 5:
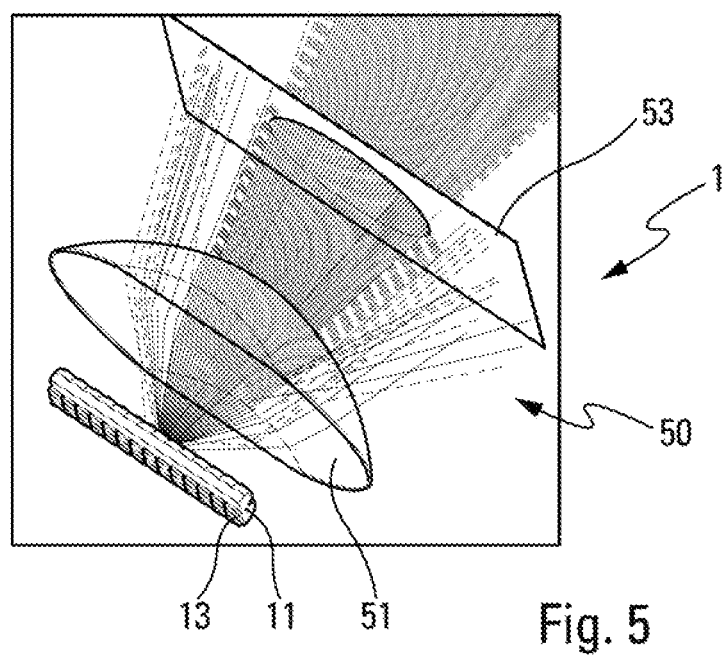
FIG. 5 shows a perspective side view of the lighting device according to the present invention provided with a light projection module.

As can be seen in FIGS. 2, 3a and 4, the lighting device 10 according to the present invention comprised an array 11 of illumination elements 12 and an array 13 of light sources 14 of the light emitting semiconductor, for example a light emitting diode (LED), type.

The lighting device 10 also comprises a means of control of each light source, not shown.

The means of control of each LED are independent from each other, such that each LED is on or off independently of the other LEDs of the array 13.

Each illumination element 12 is associated with one of the light sources 14 and configured for being lit by the associated LED source in such a way that a light beam emitted by the light source 14 exhibits a shape dependent on a shape of the illumination element 12, as will be explained in more detail below.

The array 11 of illumination elements 12 comprises at least a first illumination element 15 and a second illumination element 16.

Figure 3B:
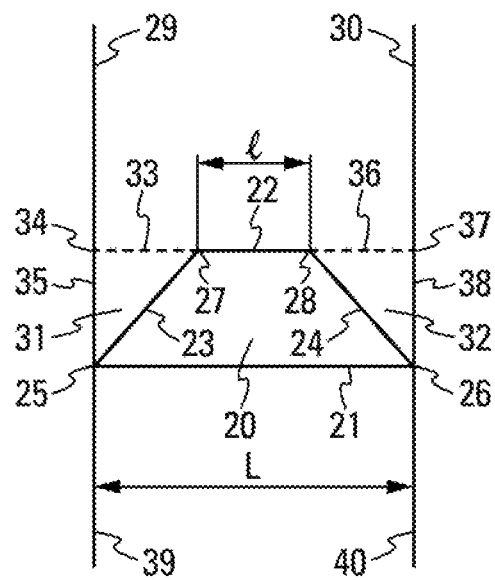

As can be seen in FIGS. 3a 3b and 4, the first illumination element 15 has a generally trapezoidal shape 20, preferably isosceles.

Each isosceles trapezium 20 is provided with two opposite parallel sides 21, 22, called bases, such that one of the bases, called the large base 21, has a length L greater than the length l of the other base 22, called the small base.

Each isosceles trapezium 20 is also provided with sides 23, 24 which are not parallel with each other and connecting the large base 21 and the small base 22.

The two sides 23 and 24 have the same length.

The sides 23 exhibit an ascending slope and allow a lows beam cut-off for driving on the right, as will be described in detail below.

The sides 24 exhibit a descending slope and allow a love beam cut-off for driving on the left, as will be described in detail below.

The large base 21 extends between two opposite ends referenced 25, 26.

The small base 22 extends between two opposite ends 27 and 28.

The end 27 of the small base 22 is disposed opposite the end 25 of the large base 21, whilst the end 28 of the small base 22 is disposed opposite the end 26 of the large base 21.

The second illumination element 16 is a counter-form of the first illumination element 15 of trapezoidal shape, that is to say that the second illumination element has a shape partially complementary to the trapezoidal shape.

The second illumination element comprises two edges 29, 30.

The edge 29 extends from the end 25 de the large base 21 of the trapezium 20, whilst the edge 30 extends from the end 26 of the large base 21.

The edges 29 and 30 are substantially parallel with each other, whilst being distant by a length of the order of the length L of the large base 21.

The second illumination element 16 comprises two portions 31, 32 disposed on either side of the large base 21 and reaching the small base 22.

The portion 31 has a substantially triangular area filling a space delimited the side 23, a segment 33 extending from the end 27 of the trapezium 20 up to a projection 34 of the end 25 on an axis bearing the small base 22, as well as a segment 35 extending from end 25 up to the projection 34.

Similarly, the portion 32 has a substantially triangular area filling a space delimited by the side 24, a segment 36 extending from the end 28 of the trapezium 20 up to a projection 37 of the end 26 on the axis bearing the small base 22, as w as a segment 38 extending from the end 26 up to the projection 37.

The shape of the illumination element 16 in counter-form of the trapezium 20 ensures an illumination of the portions 31 et 32 during the use of the lighting device 10, as will be described in detail below.

The illumination array 11 also comprises at least a third illumination element 17.

The third illumination element 17 extends from the large base 21 of the first element 15 of trapezoidal shape 20 in a direction opposite to the edges 29, 30 of the second element 16.

In other words, the third illumination element 17 comprises two edges 39, 40 substantially parallel with each other, the edge 39 extending along an extension of the edge 29 and the edge 40 extending along an extension of the edge 30.

In the embodiment shown, the illumination array comprises a plurality of aligned first, second and third illumination elements.

Advantageously, each illumination element is a lens and, preferably, a microlens.

The microlens has dimensions substantially of the same order of magnitude as an LED.

Preferably, the lens is a spherical lens, a focal point of which is disposed behind the LED array, which makes it possible to generate a magnified virtual image behind the LED array and which is projected by a module 50 for projection to infinity.

The module for projection to infinity is disposed at the output of the array of illumination elements.

The projection module comprises at least one projection lens.

Figure 6:
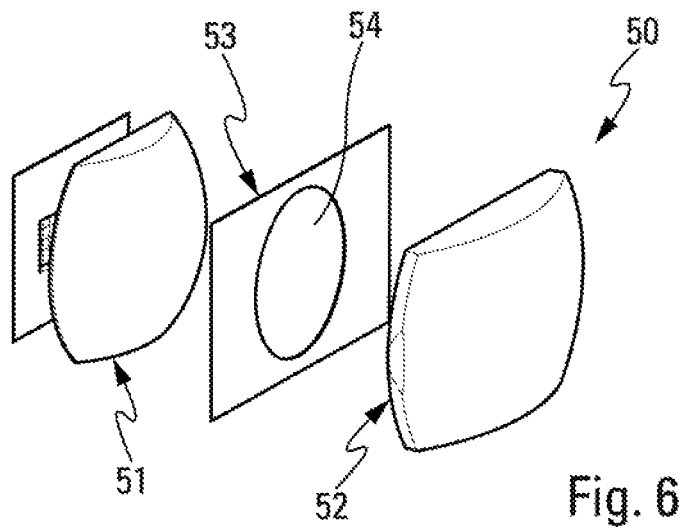
FIG. 6 shows a perspective view of the light projection module shown in FIG. 5.

In the embodiment shown in FIG. 6, the projection module 50 comprises an input lens 51, an output lens 52, and a diaphragm 53 for filtering light rays disposed between the two lenses 51 and 52.

The input lens 51 creates a virtual image of the age of the array shaped by the illumination array.

The output lens 52 is a lens for the projection of the virtual image created by the input lens 51.

The diaphragm 53 is an opaque wall provided with a central opening 54 for filtering light rays coming from an LED and passing through a microlens not associated with that LED.

The diaphragm 53 thus makes it possible to avoid generating ghost images.

Operation of the Lighting Device

Figure 7:
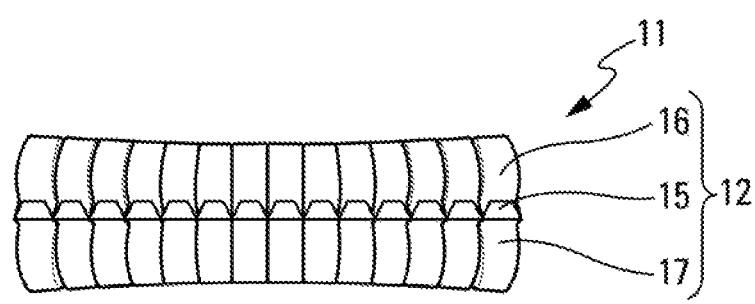
FIG. 7 shows the lighting device of the invention according to a high beam lighting mode.

FIG. 7 shows a view of the lighting device 10 when all of the LEDs are on.

In general, this case corresponds to a use of the lighting device 10 in high beam mode.

As can be seen in FIG. 7, the shape of the second illumination elements 16 in counter-form of the trapeziums 20 provides a uniform lighting by the array 11, including in the portions 31 and 32.

Figure 8:
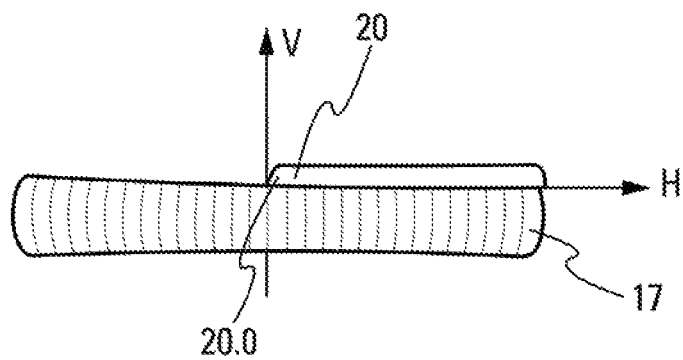
FIG. 8 shows two lighting devices of the invention according to a first lighting mode.
Figure 9:
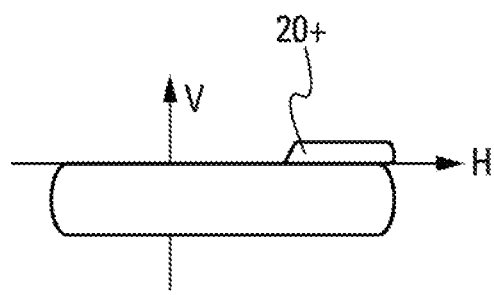
FIG. 9 shows two lighting devices of the invention according to a second lighting mode.
Figure 10:
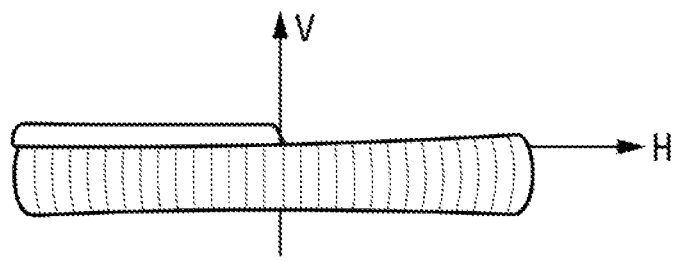
FIG. 10 shows two lighting devices of the invention according to a third lighting mode.

FIGS. 8 to 10 show a lighting emitted by an optical system of the front headlamp type for a motor vehicle comprising identical juxtaposed first 10 and second 10' lighting devices.

The two lighting devices 10, 10' are disposed such that there is generated a half-width shift at mid-height of one of the isosceles trapeziums 20.

The shifted configuration provides a doubling of the light intensity produced by the headlamp in areas where the two beams emitted by the lighting modules 10 and 10' overlap.

The shifted configuration of the two modules also provides a doubling of the resolution of the headlamp since the beam cut-off 6 is successively constituted by one side 23 of the first module 10 and then one side 23' of the second module 10'.

A first operating mode corresponds to a case of operation in low beam mode, when the road follows a straight line, for driving on the right.

As can be seen in FIG. 8, the trapeziums 20, 20' corresponding to positive abscissa of the two lighting devices 10 and 10' are on, whereas the trapeziums 20, 20' corresponding to negative abscissa are off.

The cut-off 6 of the beam in low beam mode is constituted by the side 23 of the trapezium 20-0 corresponding to the smallest positive values of abscissa and of ordinates.

The third elements 17 are all on whereas the second illumination elements 16 are all off.

A second operating mode corresponds to a case of operation in low beam mode, when the road makes a turn to the right, for driving on the right.

As can be seen in FIG. 9, only a right hand portion of the trapeziums 20 (corresponding to strictly positive values of abscissa) are on whereas the other trapeziums are off.

As in FIG. 8, the third elements 17 are all on whilst the second illumination elements 16 are all off.

The cut-off 6 of the beam in low beam mode is constituted by the side 23 of the trapezium referenced 20+ in FIG. 9.

Thus in a turn to the right, the headlamp continues to light the road without dazzling a driver of a vehicle travelling in the opposite direction.

It is noted that, advantageously, the lighting device also comprises means of slaving the lighting of the array 13 of LEDs to a sensor of a trajectory parameter of a motor vehicle.

The parameter is advantageously an angle of rotation of a steering wheel of the motor vehicle, the trajectory parameter indicating a deviation of a road upon which the vehicle is travelling with respect to a straight line, such as, in particular, a turn.

A third operating mode corresponds to a case of operation in low beam mode, when the road follows a straight line, for driving on the left.

As can be seen in FIG. 10, the trapeziums 20, 20' corresponding to negative abscissa of the two lighting devices 10 and 10' are on, whilst the trapeziums 20, 20' corresponding to positive abscissa are off.

The cut-off 6 of the beam in low beam mode is constituted by the side 24 of the trapezium 20-0 corresponding to the largest values negative values of abscissa and ordinates.

The third elements 17 are all on whilst the second illumination elements 16 are all off.

A fourth operating mode corresponds to a case of operation in high beam mode.

Figure 11:
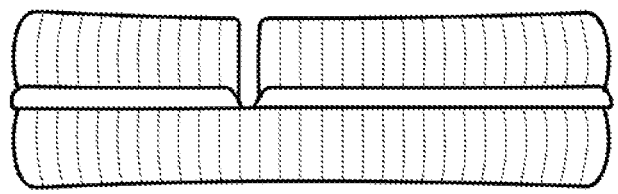
FIG. 11 shows two lighting devices of the invention according to a fourth lighting mode.

As can be seen in FIG. 11, all of the LEDs are on with the exception of a first element 15 and second element 16 pair.

In general, this case corresponds to a use in high beam mode of the lighting devices 10, 10', when a vehicle has been detected in the direction opposite to the vehicle equipped with the lighting devices.

As can be seen in FIG. 11, the shape of the second illumination elements 16 in counter-form of the trapeziums 20 provides a uniform lighting by the array 11, including in the portions 31 and 32.

Advantages

The present invention has the advantage of generating a light beam for low beam mode for which the cut-off follows the trajectory of the vehicle on a winding road, because of a discretization of the beam into successive inverted isosceles trapeziums.

The discretization according to the present invention also allows an adaption to a vehicle for driving on the right just like to a vehicle for driving on the left, and even allows a changing of driving on the right or on the left for a given vehicle.

The discretization into trapeziums also allows adaptation to a high beam that is not dazzling for another vehicle.

Thus, the present invention makes it possible to carry out different functions, such as directional low beam, driving on the left and on the right, and non-dazzling high beam.

Another advantage of the invention is the uniform lighting allowed by the association of the trapeziums and the counter-forms of trapeziums, as already indicated.

The invention claimed is:

1. Lighting device for a motor vehicle, comprising an array of at least two light sources of the light emitting semiconductor type and an array of at least a first illumination element and a second illumination element, each illumination element being in one-to-one correspondence with one of the light sources and configured for being illuminated by said associated light source in such a way that a light beam is shaped based on a shape of the respective illumination element, the first illumination element being of trapezoidal shape having two opposite parallel sides, called bases, such that one of the bases, called the large base, is longer than a length of the other base, called the small base, said first illumination element also having two triangular portions that are not parallel with each other and connecting the large base and the small base, and the second illumination element including a three-dimensional recessed portion partially complementary to the first illumination element, the recessed portion having the two triangular side portions that extend perpendicular to the trapezoidal shape from two opposite ends of the large base, parallel with each other, being distant by at least a length of the order of the length of the large base and having a rectangular portion that extends perpendicular to the large base.

2. Lighting device according to claim 1, comprising at least three light sources and three illumination elements, the third illumination element extending from the large base of the first element of trapezoidal shape in a direction opposite to the edges of the second illumination element complementary to the first illumination element.

3. Lighting device according to claim 1, comprising a bar of at least three aligned illumination elements of trapezoidal shape.

4. Lighting device according to claim 1, wherein each illumination element is a lens.

5. Lighting device according to claim 1, comprising a module for projection to infinity at the output of the array of illumination elements.

6. Lighting device according to claim 5, wherein the module for projection to infinity comprises at least one lens.

7. Lighting device according to claim 1, comprising two lenses and a diaphragm for filtering light rays disposed between the two lenses.

8. Lighting system for a motor vehicle, comprising two lighting devices according to claim 1.

9. Lighting device according to claim 2, wherein each illumination element is a lens.

10. Lighting device according to claim 3, wherein each illumination element is a lens.

11. Lighting device according to claim 2, comprising a module for projection to infinity at the output of the array of illumination elements.

12. Lighting device according to claim 3, comprising a module for projection to infinity at the output of the array of illumination elements.

13. Lighting device according to claim 4, comprising a module for projection to infinity at the output of the array of illumination elements.

14. Lighting device according to claim 2, comprising two lenses and a diaphragm for filtering light rays disposed between the two lenses.

15. Lighting device according to claim 3, comprising two lenses and a diaphragm for filtering light rays disposed between the two lenses.

16. Lighting device according to claim 4, comprising two lenses and a diaphragm for filtering light rays disposed between the two lenses.

17. Lighting device according to claim 5, comprising two lenses and a diaphragm for filtering light rays disposed between the two lenses.

18. Lighting device according to claim 6, comprising two lenses and a diaphragm for filtering light rays disposed between the two lenses.

19. Lighting system for a motor vehicle, comprising two lighting devices according to claim 2.

* * * * *